United States Patent [19]

Budman et al.

[11] Patent Number: 5,377,625
[45] Date of Patent: Jan. 3, 1995

[54] PROLATE RECREATIONAL AND AMUSEMENT DEVICE

[76] Inventors: Sandra F. Budman; Jack F. Budman, both of 21 Valerian Ct., Rockville, Md. 20852

[21] Appl. No.: 168,499
[22] Filed: Dec. 22, 1993

Related U.S. Application Data

[63] Continuation-in-part of Ser. No. 45,168, Apr. 13, 1993, Pat. No. 5,351,652.

[51] Int. Cl.⁶ ............................................. A01K 29/00
[52] U.S. Cl. ................................................... 119/709
[58] Field of Search .............................. 119/709, 711

[56] References Cited

U.S. PATENT DOCUMENTS 777,478   12/1904  Minor .
3,356,367 12/1967  Tewksbury .
3,520,534  7/1970  Bennett et al. .
4,081,182  3/1978  O'Brien .
4,825,812  5/1989  Visalli et al. .

FOREIGN PATENT DOCUMENTS 1188459 4/1970 United Kingdom .

Primary Examiner—Gene Mancene
Assistant Examiner—Thomas Price

[57] ABSTRACT

A recreational device for horses takes the form of a resilient generally prolate spheroid body having a grip simulating a bridle bit and adapted to be engaged between a horse's upper and lower teeth. The body is preferably inflatable elastomeric material impregnated or otherwise treatable with a substance to produce an aroma of apple, honey, molasses-containing materials or other food substances attractive to horses. The grip may be configured and located to prevent the body from rolling about its major axis away from a horse.

13 Claims, 1 Drawing Sheet

PROLATE RECREATIONAL AND AMUSEMENT DEVICE

CROSS-REFERENCE TO RELATED APPLICATIONS

This application is a continuation-in-part of our co-pending U.S. patent application Ser. No. 08/045,168, filed Apr. 13, 1993 now U.S. Pat. No. 5,351,652 and entitled "Recreational and Amusement Device for Horses". The disclosure in that patent application is expressly incorporated herein in its entirety.

BACKGROUND OF THE INVENTION

1. Technical Field

The present invention pertains to recreational and amusement devices for horses and, more particularly, to methods and apparatus for inducing and encouraging horses to play and exercise with such devices.

2. Discussion of the Prior Art

A known amusement device for horses is sold under the trademark HORSEBALL and comprises an inflatable spherical hollow ball having a hollow grip in the form of a loop extending radially therefrom. Horses are encouraged to grasp the grip between their upper and lower teeth and then run and play with the grasped ball, thus helping them to exercise and strengthen their neck muscles and alleviate shyness around the face and head. When dropped the ball may be kicked about by the horses who may also fling the ball from their mouths as a source of therapeutic recreation and amusement. All of these activities result in exercise and reduced boredom for the horse. Although many horses readily take to the prior art device, there are some who may not. Accordingly, there is a need to improve upon the aforesaid device to render it more appealable to most horses.

It has also been observed that the prior art spherical amusement device has a tendency to roll away from a horse, particularly on sloped terrain. For some horses and their owners this tends to bring on frustration and discouragement, resulting in a permanent dislike and avoidance of the device. It is desirable, therefore, to improve the device in a manner that prevents the device from rolling away from a horse.

In our aforesaid patent application we disclose a generally bell-shaped inflatable device having numerous advantages over prior art spherical devices. One important advantage is the inability of the device to roll in a straight line, thereby precluding it from rolling away from a horse, particularly on sloped terrain. We have found that, while the bell-shaped device is useful, it bounces erratically or, when dropped in certain orientations, not at all. Predictable bouncing is a desirable feature of devices of this kind since many horses enjoy kicking the device as part of their amusement and exercise. Erratic bouncing, and the total absence of bouncing, causes horses to stop running and often to lose interest in the device.

OBJECTS AND SUMMARY OF THE INVENTION

Accordingly, it is an object of the present invention to provide an improvement to the aforesaid amusement device to render it more readily appealable to horses and to avoid discouragement against its use.

According to the present invention, the amusement device, when fully inflated, is configured as a generally prolate spheroid with a grip positioned to prevent the device from rolling away along the major axis of the device. In the preferred embodiment the grip is configured as a bridle bit disposed on the surface of the device to extend lengthwise along the longer dimension of the device (i.e., in a plane containing the longer or major axis). The grip is preferably a simulated snaffle bit and is hollow to provide flow communication with the hollow ball interior and to be compressible when gripped between a horse's teeth.

The elastomeric ball material may be impregnated or otherwise treated with a substance emitting an aroma of a food treat for horses. The aroma, which may be derived from actual food substances or from compounds designed to simulate the food aroma, is typically that of apple, honey, molasses-containing products or combinations of these.

The prolate spheroid configuration permits the device to roll only about its major axis (i.e., it cannot roll end over end about its minor axis). The bridle bit location, however, limits such rolling to one revolution. On the other hand, the prolate spheroid configuration is continuously curved with no sharp transitions in its exterior surface. Accordingly, when the ball is dropped it always bounces in a regular manner to facilitate kicking exercises by a running horse.

These and other objects, features and many of the attendant advantages of the present invention will be appreciated more readily as they become better understood from a reading of the following description considered in connection with the accompanying drawings wherein like parts in each of the several figures are identified by the same reference characters.

DESCRIPTION OF THE PREFERRED EMBODIMENTS

Figure 4:
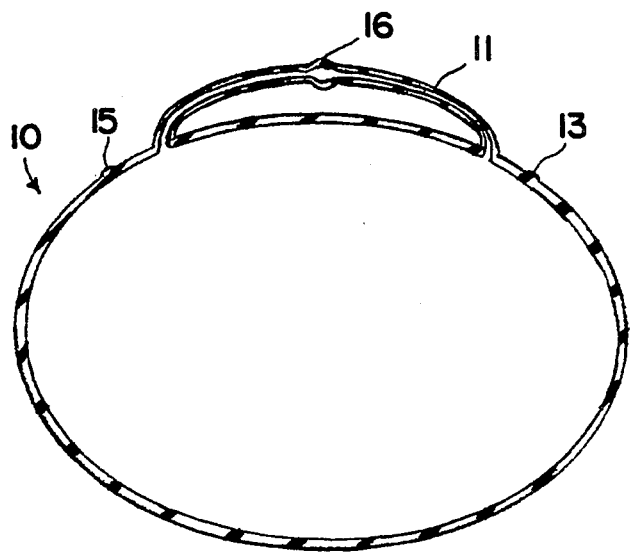
FIG. 4 is a view in longitudinal section taken along lines 4—4 of FIG. 3.
Figure 3:
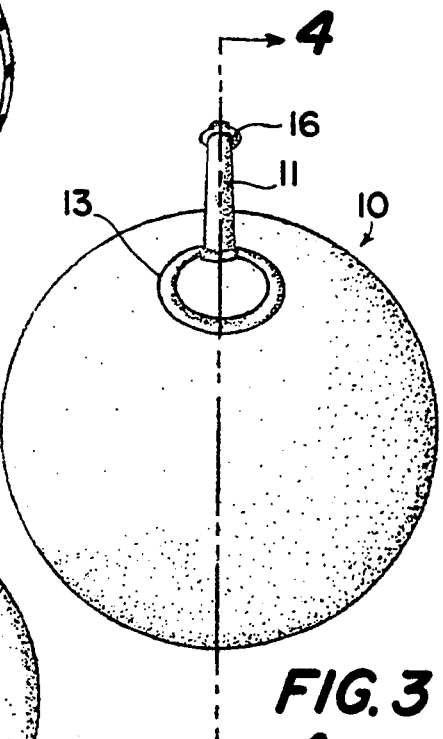
FIG. 3 is an end view in elevation of the device of FIG. 1.
Figure 1:
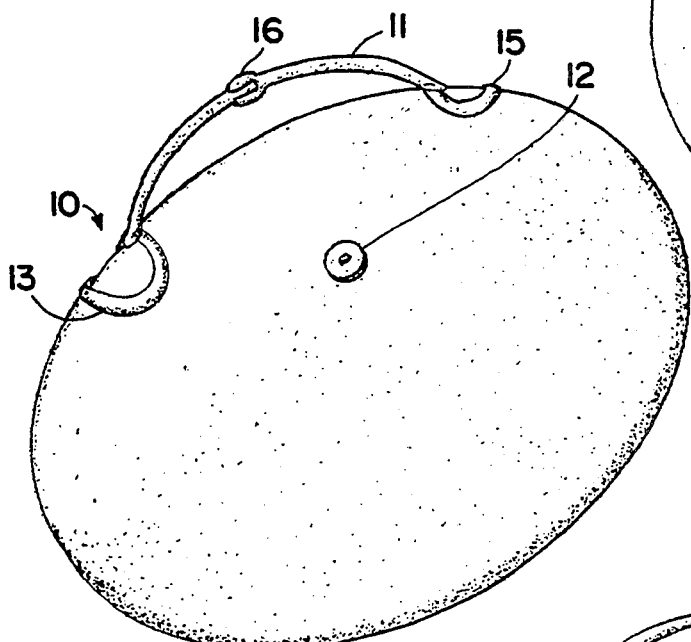
FIG. 1 is a view in perspective of a preferred embodiment of the horse amusement device of the present invention.
Figure 2:
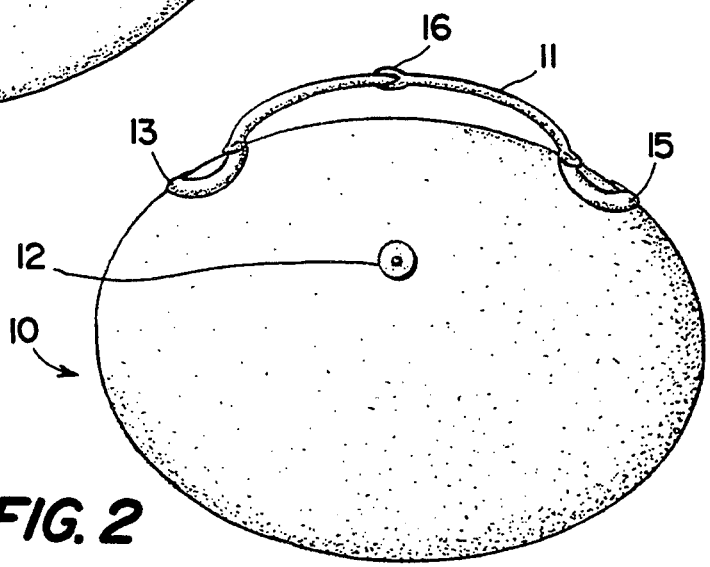
FIG. 2 is a side view in elevation of the device of FIG. 1.

Referring more specifically to the drawings, one embodiment of an amusement and recreational device 10 for horses takes the form of an inflatable generally prolate spheroid of rubber, vinyl or other elastomeric material. The device is preferably molded from that material using conventional molding procedures. An inflation valve 12 for receiving an inflation needle is suitably disposed in the device periphery. It should be noted, however, that for purposes of the principles of the present invention, device 10 need not be inflatable; rather, it is only necessary that the device be resilient enough to bounce when dropped from a height of at least one foot.

A grip 11 takes the form of a bridle bit. In the preferred embodiment the bridle bit is a simulated snaffle bit, preferably an eggbutt snaffle bit, extending between two locations on the ball periphery. At each such location the surface of the ball is raised to define a decorative ring 13, 15 simulating the bridle engagement or rein rings of a snaffle bit. Grip 11 extends away from the ball and bridges or spans the two rings 13 and 15. Substantially centrally located in grip 11 is a simulated snaffle bit joint 16 formed of two engaged simulated eye members. The entirety of grip 11 is hollow to provide a flow passage 11 in communication with the hollow ball interior at both of the grip ends. The grip may thus be radially compressed when engaged between the upper and lower teeth of a horse. Bit joint 16 is, as stated, simulated, meaning that the outside contour appears as a joint but the joint eyes are integrally formed and mutually fixed in position.

Grip 11 is sized and spaced from ball 10 to permit the grip to be readily engaged between a horse's upper and lower teeth. Typically, the length of grip 11 is on the order of four to twelve inches, and the spacing of simulated knuckle joint 16 from the ball surface is on the order of one and one-half to five inches. These dimensions are stated by way of example only and are not limiting on the scope of the present invention. The familiar feel of the simulated snaffle bit, or any other bridle bit, on the horse's tongue and between a horse's teeth renders it more likely that a horse will play with the ball.

The prolate spheroid configuration with a projecting grip extending in its long dimension is highly advantageous to prevent the device from rolling away while still permitting the device to bounce. The grip is preferably disposed in a plane containing the major axis of the prolate spheroid, and projects from the body sufficiently to preclude rolling of the device about that axis.

In an exemplary embodiment, device 10 may have the following dimensions: the minor or shorter axis of the device fully inflated is approximately 14"; the major or longer axis is approximately 18"; the length of grip 11 along the surface of the device is approximately 10"; and the spacing between the grip and the device surface is approximately 2". These dimensions are all approximate and provided by way of example only.

According to another aspect of the invention, the material from which device 10 is formed is treated with a substance that emits an aroma appealing to horses. Typically, the aroma emitted will be that of apple, honey, molasses-type substances or combinations of these. In the preferred embodiment of the invention, the substance is impregnated into the elastomeric material in a conventional manner; other known processes for rendering the material aroma-emitting may be employed. Whatever the technique, the emission from the device of an aroma that appeals to a horse dramatically increases the likelihood that the horse will play with the ball.

From the foregoing description it will be appreciated that the invention makes available a novel recreational and amusement device of generally prolate spheroid configuration for use by a horse wherein a grip is provided in the form of a bridle bit at a location to preclude rolling of the device about its major axis.

Having described a preferred embodiment of a new and improved recreational and amusement device for horses in accordance with the present invention, it is believed that other modifications, variations and changes will be suggested to those skilled in the art in view of the teachings set forth herein. Accordingly, it is to be understood that all such variations, modifications and changes are believed to fall within the scope of the present invention as defined by the appended claims.

What is claimed is:

1. A recreational device for horses comprising:
   a resilient body capable of bouncing when dropped from a height of at least one foot;
   a grip projecting from said device and having a configuration suitable for engagement between a horse's upper and lower teeth;
   wherein said body has the shape of a generally prolate spheroid, and wherein said grip is located to preclude continued rolling of said device about the major axis of said prolate spheroid;
   wherein said grip is a simulated bridle bit; and
   wherein said bit is a snaffle bit comprising first and second spaced rings defined as respective raised portions on said body and corresponding to respective ends of said grip.

2. The recreational device of claim 1 wherein said resilient body is inflatable and said material is elastomeric.

3. The recreational device of claim 2 wherein said elastomeric material is impregnated with an aroma-producing substance to emit an aroma of food for horses.

4. The recreational device of claim 3 wherein said food is selected from the group consisting of apple, honey, molasses-containing substances and combinations thereof.

5. The recreational device of claim 1 wherein said snaffle bit further includes a simulated snaffle bit joint comprising two engaged simulated eye members disposed intermediate said rings at a location spaced from said body, and first and second grip segments extending between said joint and said first and second rings, respectively.

6. A recreational device for horses comprising:
   a resilient body capable of bouncing when dropped from a height of at least one foot;
   a grip projecting from said device and having a configuration suitable for engagement between a horse's upper and lower teeth;
   wherein said body has the shape of a generally prolate spheroid, and wherein said grip is located to preclude continued rolling of said device about the major axis of said prolate spheroid;
   wherein said resilient body is inflatable and said material is elastomeric; and
   wherein said grip is hollow and in flow communication with the interior of said inflatable body at two locations on the body periphery.

7. A recreational device for horses comprising:
   a resilient body capable of bouncing when dropped from a height of at least one foot;
   a grip projecting from said device and having a configuration suitable for engagement between a horse's upper and lower teeth;
   wherein said body has the shape of a generally prolate spheroid, and wherein said grip is located to preclude continued rolling of said device about the major axis of said prolate spheroid; and
   said grip extends lengthwise in a plane including the major axis of said prolate spheroid.

8. The recreational device of claim 7 wherein said resilient body is an elastomeric material impregnated with an aroma-producing substance to emit an aroma attractive to horses.

9. The recreational device of claim 7 wherein said resilient body is inflatable and said material is elastomeric, and wherein said grip is hollow and in flow communication with the interior of said inflatable body at two locations on said periphery.

10. A recreational device for horses comprising:

an inflatable generally prolate spheroid body having a hollow interior and capable of bouncing when inflated and dropped to a surface from a height of at least one foot; and a grip extending from said body and configured as a hollow bridle bit suitable for engagement between a horse's upper and lower teeth, said bridle bit being disposed to preclude continuous rolling of said body about its major axis and having a hollow interior and first and second ends secured to respective first and second locations on said body to provide flow communication through the hollow bridle bit interior from the interior of said body.

11. The recreational device of claim 10 wherein said bridle bit is a simulated snaffle bit.

12. The recreational device of claim 10 wherein said body is a molded elastomeric material impregnated with a substance emitting a sweet food aroma attractive to horses.

13. The recreational device of claim 10 wherein said grip extends lengthwise in a plane including the major axis of said prolate spheroid.

* * * * *